United States Patent
Vizcargüenaga Vizcarguenaga et al.

(10) Patent No.: US 11,022,184 B2
(45) Date of Patent: Jun. 1, 2021

(54) RIGID CONNECTING ROD COUPLING BETWEEN TWO SHAFTS

(71) Applicant: IDOM, S.A.U., Bilbao (ES)

(72) Inventors: Alberto Vizcargüenaga Vizcarguenaga, Bilbao (ES); Iñigo Eletxiger Ra Aja, Bilbao (ES); Osear Vega Beascoa, Bilbao (ES); Javier Ariño Viar, Bilbao (ES); Armando Bilbao Arechabala, Bilbao (ES); Miguel Martin Abad, Bilbao (ES); Rubén Sanquirce Garcia, Bilbao (ES); Alex Aviles Ajuria, Bilbao (ES)

(73) Assignee: IDOM, S.A.U., Bilbao (ES)

( * ) Notice: Subject to any disclaimer, the term of this patent is extended or adjusted under 35 U.S.C. 154(b) by 348 days.

(21) Appl. No.: 16/062,027

(22) PCT Filed: Dec. 23, 2015

(86) PCT No.: PCT/ES2015/070946
§ 371 (c)(1),
(2) Date: Jun. 13, 2018

(87) PCT Pub. No.: WO2017/109236
PCT Pub. Date: Jun. 29, 2017

(65) Prior Publication Data
US 2018/0363713 A1 Dec. 20, 2018

(51) Int. Cl.
*F16D 3/60* (2006.01)
*F16D 3/04* (2006.01)
*F16D 3/06* (2006.01)

(52) U.S. Cl.
CPC .............. *F16D 3/60* (2013.01); *F16D 3/04* (2013.01); *F16D 3/06* (2013.01)

(58) Field of Classification Search
CPC .............. F16D 3/60; F16D 3/04; F16D 3/06
USPC .......................................... 464/69, 137, 138
See application file for complete search history.

(56) References Cited

U.S. PATENT DOCUMENTS

| 1,242,906 | A | | 10/1917 | Augustine | |
|---|---|---|---|---|---|
| 1,976,131 | A | * | 10/1934 | Kittredge | F16D 3/60 464/137 |
| 2,292,675 | A | | 8/1942 | Thiry | |
| 2,551,837 | A | | 5/1951 | Holloway | |
| 2013/0040742 | A1 | | 2/2013 | Exner et al. | |
| 2014/0228131 | A1 | | 8/2014 | Exner | |

FOREIGN PATENT DOCUMENTS

| DE | 4205666 A1 | | 9/1993 | |
|---|---|---|---|---|
| DE | 4205666 C2 | | 2/1994 | |
| EP | 2557327 A1 | | 2/2013 | |
| FR | 1325013 | * | 3/1963 | 464/69 |

(Continued)

*Primary Examiner* — Greg Binda
(74) *Attorney, Agent, or Firm* — Aslan Law, P.C.

(57) ABSTRACT

A flexible coupling between two shafts. The flexible coupling includes a spacer element inserted between an actuating shaft or a drive shaft and an actuated shaft or a load shaft. The flexible coupling includes an assembly of articulated connecting rods at both points of connection. The articulated connecting rods respectively linking the two elements to be connected. All of the connecting rods on both ends being articulated in ball joints used to facilitate the rotation of the connecting rods in any direction.

4 Claims, 4 Drawing Sheets

(56) References Cited

FOREIGN PATENT DOCUMENTS

| | | | | | |
|---|---|---|---|---|---|
| GB | 463066 | * | 3/1937 | .................. | 464/138 |
| JP | 49-34937 Y | * | 9/1974 | | |
| JP | S4934937 Y1 | | 9/1974 | | |

* cited by examiner

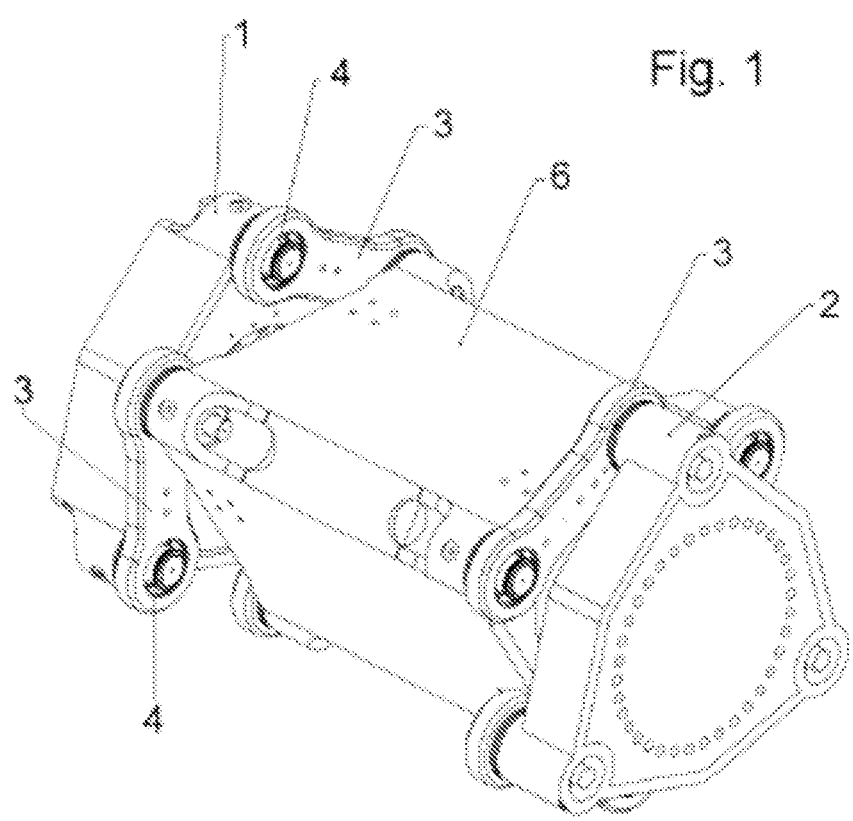

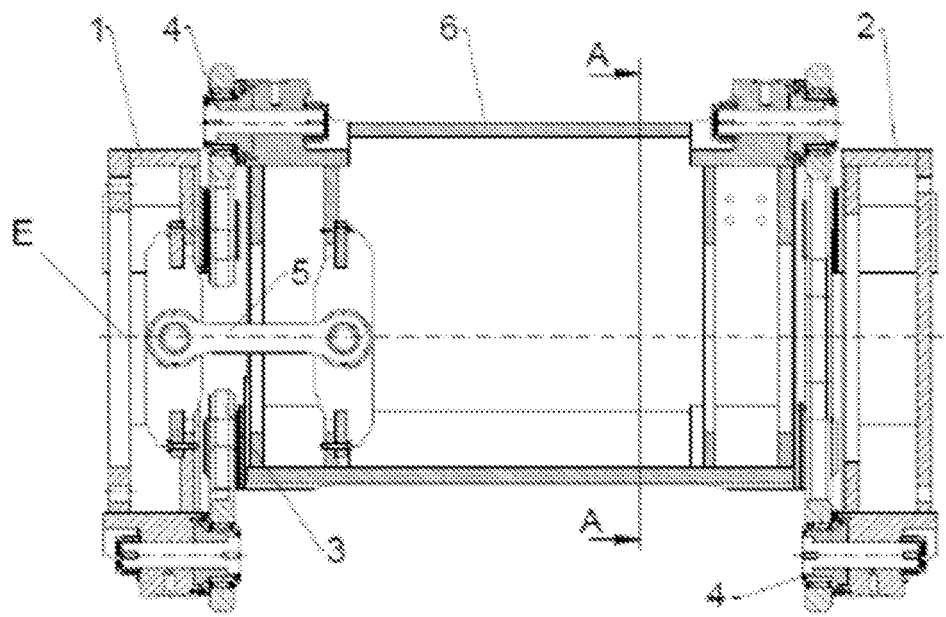
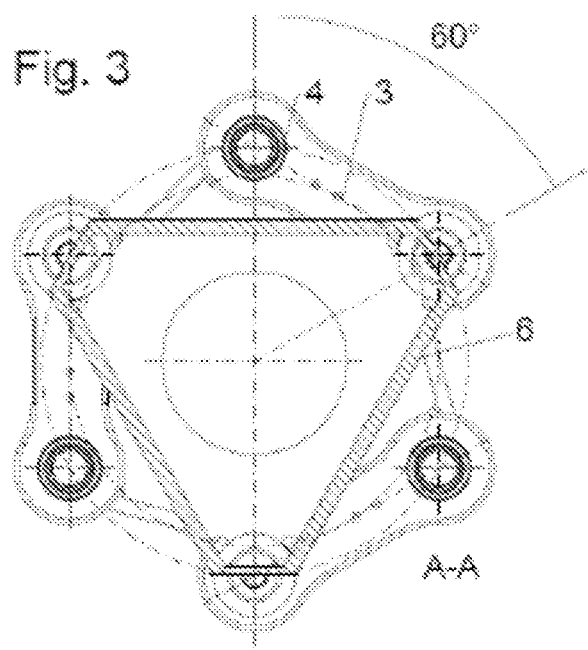

RIGID CONNECTING ROD COUPLING BETWEEN TWO SHAFTS

OBJECT OF THE INVENTION

A coupling is a device used to connect two shafts at the ends thereof in order to transmit power between them, ensuring that potential disalignments (radial, angular, axial or combinations thereof) between the shafts do not cause irregularities in the torque transmission nor generate internal forces which may lead to vibration.

The coupling of the invention is flexible, since it supports certain types of disalignments, although it is mainly characterized by being highly rigid and by the absence of backlash in the torque transmission and small amount of internal forces generated. Specifically, it is especially designed for cases where there is significant torque, such as between turbines and generators, for example in wind turbines, or similar applications, and potential radial or angular disalignments or even axial play (displacement) between shafts.

BACKGROUND OF THE INVENTION

Universal joints allow significant angular and radial disalignments and are in fact often used to transmit motion between parallel shafts. The problem they have is that output speeds vary, leading to the use of a double universal joint connected together by an intermediate shaft. Even so, it is difficult to maintain the angular velocity of the coupling, for which purpose the shafts of both joints must be parallel. On the other hand, the power that can be transmitted through this type of coupling is relatively low and cannot be applied in the cases provided above.

Document DE4205666 discloses a coupling with two end shafts that are connected by means of a joint and in which two respective connecting rod assemblies are mounted on both ends, fastened between an actuating element and the coupling. There are four connecting rods, arranged at 90°, which compensate the displacement between interconnected units up to a certain degree, both angularly and axially. The connecting rods are mounted on rubber bushings, which perform a buffer function up to a certain degree, as well as to compensate for the change in the distance during the rotation of the coupling. This type of coupling enables a certain, although very limited, radial and angular disalignment to be balanced.

The coupling described in EP2557327 has a drive-side fastening unit and a load-side fastening unit arranged in a common radial plane around the rotation axis and containing several tangential connecting rods coupled at their ends to the respective parts to be connected by means of bearings or ball joints, circumferentially spaced apart by about 90°, making the formation of a so-called constant speed joint possible. This constant speed joint leads to the formation of a constant speed coupling in which axial displacement can also be compensated without incorporating an elastomer between the input and output of the coupling.

Document US2014228131 likewise describes a coupling for transmitting significant torques between the drive-side head and the load-side fastener. This connection is made through an intermediate shaft that couples, both on the drive-side and on the load-side, with several tangential connecting rods that are on both sides circumferentially spaced between 80° and 100°, each one of the joints articulating these connecting rods being formed by multiple joints connected in series to allow movement in all three XYZ axes.

DESCRIPTION OF THE INVENTION

The object of the invention is to propose a rigid connecting rod coupling between two shafts with a certain arrangement and number of connecting rods, as well as a certain circumferential phase shift therebetween to achieve more compact coupling with more effective torque transmission in a very rigid arrangement and without backlash, in which the forces generated as a result of the disalignments are minimal.

The coupling includes a spacer element inserted between the actuating shaft or drive shaft and the actuated shaft or load shaft, attached to the drive shaft and the load shaft by both ends through three connecting rods having a length such that, in both cases, they exhibit an approximate circumferential phase shift of 60°, all of the connecting rods on both ends being articulated in ball joints used to facilitate the rotation thereof in any direction, so that the coupling can adapt itself to all of the potential disalignments that may occur, both radially and axially, or when there is play between the spacer and the load.

According to a particular characteristic of the invention, between the spacer element and the drive shaft there is another connecting rod positioned axially between both elements. The purpose of said connecting rod is to stabilize this area by preventing relative axial movement between both elements beyond what is required when the spacer is slightly misaligned with respect to the motor due to the occurrence of radial disalignment. Thus, the connecting rods of the point of connection between the spacer element and the motor shaft are at all times in the same plane, which is essentially perpendicular to the shaft of both elements.

According to another characteristic of the invention, said spacer has a triangular prism configuration, arranging in each of its vertices one of the ball joints corresponding to each of the connecting rods that transmit torque from the drive side and the load side.

DESCRIPTION OF THE FIGURES

As a complement to the description and for the purpose of helping to make the characteristics of the invention more readily understandable, the present specification is accompanied by a set of drawings which, by way of illustration and not limitation, represent the following:

FIG. 1 shows a general perspective view of a coupling made according to the invention.

FIG. 2 shows an axial cross section along a vertical plane of this coupling.

FIG. 3 represents the section A-A marked in FIG. 2

FIG. 4 shows aligned coupling.
FIG. 5 shows coupling with axial play.
FIG. 6 shows coupling with radial displacement.
FIG. 7 shows coupling with angular displacement.

PREFERRED EMBODIMENT OF THE INVENTION

Figure 4:
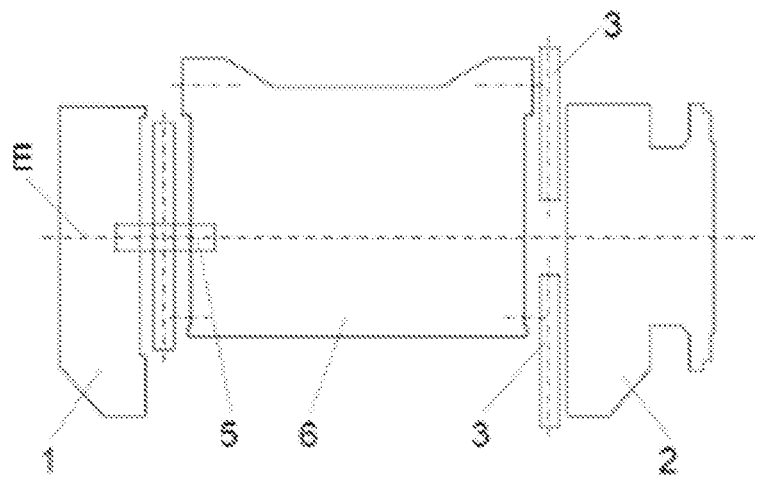
FIGS. 4 to 7 show schematic side elevational views of the different disalignments that the coupling is able to absorb, subject to the misalignments that may exist between the drive shaft and the load shaft.

According to the figures, the coupling of the invention comprises a spacer element (6) inserted between the actuating shaft or drive shaft (1) and the load shaft (2). Both points of connection are made by means of respective articulated connecting rod assemblies (3), which respectively link the spacer element (6) and the actuating shaft (1), on one hand, and the spacer element (6) with the load shaft (2), on the other. All the joints of the connecting rods (3) in the shaft on both the motor and load sides, as well as in the spacer side (6) are made by ball joints (4) with negligible friction, such that the only source of minimal internal force arises from the disalignment of the connecting rods.

The connecting rods (3) in each area (between the drive shaft (1) and the spacer (6) and between this spacer and the load shaft (2)) are tangentially arranged with respect to the coupling shaft and have a length such that, in both cases, they exhibit an approximate circumferential phase shift of 60°. (See FIG. 3).

On the other hand, in this preferred embodiment the spacer (6) has a triangular prism configuration, wherein one of the ball joints corresponding to each of the connecting rods that transmit torque from the drive side and the load side is arranged in each of its vertices. In this triangular configuration, the number of connecting rods per side (three in both) and the circumferential phase shift set at 60° provide more compact coupling and more efficient torque transmission, since the moment of inertia is reduced with respect to any existing in the prior art.

Figure 5:
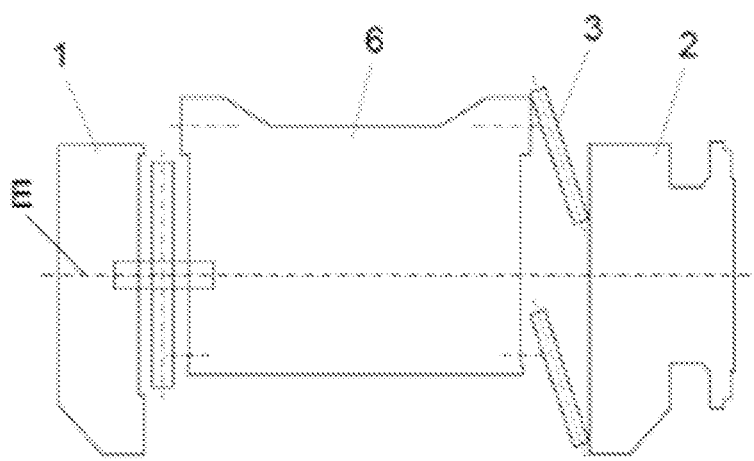
Figure 6:
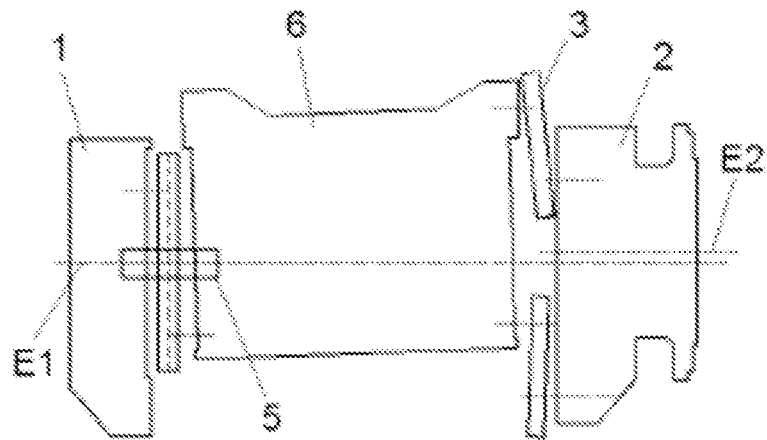
Figure 7:
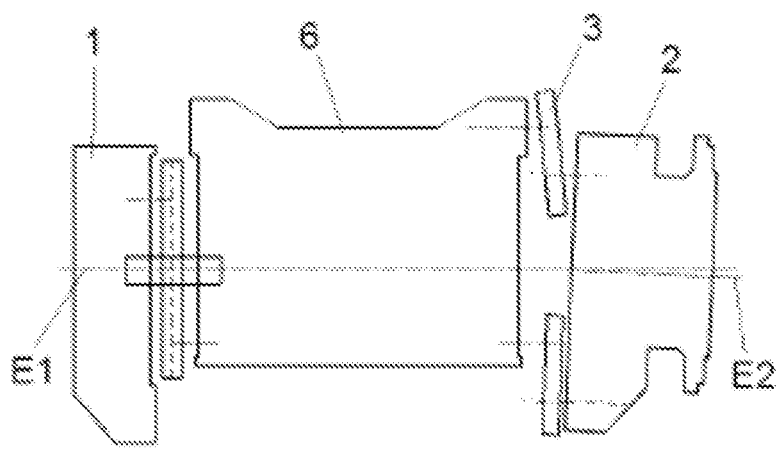

In addition to the six articulated connecting rods (3) which transmit torque, there is a seventh connecting rod, herein referred to as an axial connecting rod (5), which is intended to stabilize the spacer (6) axially by connecting it to the drive shaft (1) thus preventing axial play between both elements in this area beyond what is required when the spacer (6) is to be slightly misaligned with respect to the motor (1) due to the occurrence of angular disalignment in the coupling (see FIG. 6). On the opposite side, where the spacer (6) is facing the load (2), there is no axial connecting rod or any other means preventing axial play between these two elements (6, 2) as shown in FIG. 5.

Thanks to the ball joint (4) provided with each of the connecting rods (3) it is possible to make couplings with all the potential movements, as shown in FIGS. 4 to 7, and a combination of all or parts thereof. The ball joints (4) are optionally equipped with anti-backlash systems to ensure that the high levels of torsional rigidity of the system are not compromised by backlash.

FIG. 4 shows an aligned coupling, in which the drive shaft (1) and the load shaft (2) are engaged with one another (e.g., a first axis (E)). This is ideal for any coupling; however, this alignment is usually hypothetical since there is usually exists some kind of disalignment, in which case the coupling itself would adopt the proper configuration as follows:

When the alignment (E1) and (E2) of shafts (1 and 2) are aligned, but there is a certain axial play in the coupling, the spacer (6) is separated by the face facing the load of the load shaft (2); for this purpose, the connecting rods (3) adopt a position in planes that are parallel to each other, but do not lie perpendicular to the alignment (E2) of the load shaft (2), since they occupy the opening existing in the area as shown in FIG. 5.

When a radial disalignment (FIG. 6) takes place, meaning that alignment (E1) and (E2) of shafts (1 and 2) are parallel but are not engaged with one another, what happens is that the spacer (6) bends by engaging the ends of its shafts respectively with the drive shaft (1) and with the load shaft (2). To make this possible, the connecting rods (3) adopt a position through the ball joints (4) in which their planes converge toward a point located next to the load (2).

When there is an angular disalignment (FIG. 7), which takes place when the alignment (E1) and (E2) of shafts (1) and (2) form an angle close to 360° but without being engaged with one another, the connecting rods (3) need to adopt a position through the ball bearings (4) in which their planes converge toward a point located next to the load (2).

When shafts (E1) and (E2) are aligned, but there is a certain axial play in the coupling, the spacer (6) is separated by the face facing the load of the load shaft (2); for this purpose, the connecting rods (3) adopt a position in planes that are parallel to each other, but do not lie perpendicular to the shaft (E2), since they occupy the opening existing in the area as shown in FIG. 5.

When a radial disalignment (FIG. 6) takes place, meaning that shafts (E1) and (E2) are parallel but are not engaged with one another, what happens is that the spacer (6) bends by engaging the ends of its shafts respectively with the drive shaft (E1) and with the load shaft (E2). To make this possible, the connecting rods (3) adopt a position through the ball joints (4) in which their planes converge toward a point located next to the load (2).

When there is an angular disalignment (FIG. 7), which takes place when shafts (E1) and (E2) form an angle close to 360° but without being engaged with one another, the connecting rods (3) need to adopt a position through the ball bearings (4) in which their planes converge toward a point located next to the load (2)

Optionally, the connecting rods (3) can be equipped with a load measuring system to monitor the axial load and the torque applied.

Having sufficiently described the nature of the invention and a preferred embodiment, it is hereby provided for all appropriate purposes that the materials, shape, size and arrangement of the elements described herein can be modified, provided that this entails no modification of the essential characteristics of the invention claimed below:

The invention claimed is:
1. A flexible coupling comprising:
a first shaft;
a second shaft;
a first set of connecting rods, wherein the first set of connecting rods includes a first connecting rod, a second connecting rod, and a third connecting rod;
a second set of connecting rods, wherein the second set of connecting rods includes a fourth connecting rod, a fifth connecting rod and a sixth connecting rod;
a seventh connecting rod;
a spacer element, wherein
the spacer element is located between the first shaft and the second shaft along a first axis,
the spacer element is located between the first set of connecting rods and the second set of connecting rods along the first axis,
the first set of connecting rods and the second set of connecting rods are located between the first shaft and the second shaft along the first axis,
the spacer element is coupled to the first set of connecting rods via a first set of ball joints,
the spacer element is coupled to the second set of connecting rods via a second set of ball joints,
the first shaft is coupled to the first set of connecting rods via a third set of ball joints,
the second shaft is coupled to the first set of connecting rods via a fourth set of ball joints, the seventh connection rod is coupled to the first shaft and the spacer element, the seventh connection rod extends from a first side of the seventh connection rod to a second side of the seventh connection rod along the first axis, the seventh connection rod extends perpendicular to the first set of connecting rods, the first set of connecting rods are located between a first end of the seventh connection rod and a second end of the seventh connection rod, and the first set of connecting rods are located between the first side of the seventh connection rod and the second side of the seventh connection rod along the first axis.

2. The flexible coupling according to claim 1, wherein the first side of the seventh connection rod extends into the first shaft along the first axis, and the second side of the seventh connection rod extends into the spacer element along the first axis.

3. The flexible coupling according to claim 1, wherein the spacer element has a triangular prism configuration.

4. The flexible coupling according to claim 3, wherein the first side of the seventh connection rod extends into the first shaft along the first axis, and the second side of the seventh connection rod extends into the spacer element along the first axis.

* * * * *